United States Patent
Billich

(10) Patent No.: US 12,352,292 B2
(45) Date of Patent: *Jul. 8, 2025

(54) LOAD-CONTROLLED HYDRAULIC SUPPLY FOR AN ATTACHMENT ATTACHED TO AN AGRICULTURAL TRACTOR

(71) Applicant: DEERE & COMPANY, Moline, IL (US)

(72) Inventor: Manuel Billich, Dischingen (DE)

(73) Assignee: DEERE & COMPANY, Moline, IL (US)

( * ) Notice: Subject to any disclaimer, the term of this patent is extended or adjusted under 35 U.S.C. 154(b) by 122 days.

This patent is subject to a terminal disclaimer.

(21) Appl. No.: 18/348,618

(22) Filed: Jul. 7, 2023

(65) Prior Publication Data
US 2024/0018979 A1    Jan. 18, 2024

(30) Foreign Application Priority Data
Jul. 18, 2022   (DE) .......................... 102022117880.3

(51) Int. Cl.
*F15B 13/02* (2006.01)
*A01B 63/00* (2006.01)
*F15B 1/26* (2006.01)

(52) U.S. Cl.
CPC .............. *F15B 1/265* (2013.01); *A01B 63/00* (2013.01); *F15B 13/025* (2013.01); *F15B 2211/522* (2013.01)

(58) Field of Classification Search
CPC ...... F15B 1/265; F15B 13/025; F15B 11/168; F15B 11/165; A01B 13/025
See application file for complete search history.

(56) References Cited

U.S. PATENT DOCUMENTS

| | | | |
|---|---|---|---|
| 5,791,142 A | 8/1998 | Layne et al. | |
| 7,434,393 B2 | 10/2008 | Hesse | |
| 9,874,884 B2 | 1/2018 | Knapper | |
| 11,261,582 B1 | 3/2022 | Andreuccetti et al. | |
| 11,572,670 B2 | 2/2023 | Schmuttermair et al. | |
| 11,713,775 B2 | 8/2023 | Maro et al. | |
| 2019/0345694 A1 | 11/2019 | Schmuttermair et al. | |
| 2021/0123462 A1 | 4/2021 | Bonenfant et al. | |

FOREIGN PATENT DOCUMENTS

| | | |
|---|---|---|
| DE | 102014004337 A1 | 10/2014 |
| DE | 102013220750 A1 | 4/2015 |
| DE | 102018207158 A1 | 11/2019 |
| EP | 2863068 A1 | 4/2015 |
| EP | 3567167 A2 | 11/2019 |

(Continued)

OTHER PUBLICATIONS

United States Office Action, U.S. Appl. No. 18/348,606, filed Jun. 21, 2024, 09 pages.

(Continued)

*Primary Examiner* — Kenneth Bomberg
*Assistant Examiner* — Daniel S Collins

(57) ABSTRACT

A load-controlled hydraulic supply for an attachment attached to an agricultural tractor includes a hydraulic high-pressure source providing a volume flow in a supply line, a return line leading to a hydraulic reservoir, and a load-indicating line connected to a device for pressure limiting. The volume flow is adjusted based on pressure feedback prevailing at the load-indicating line.

15 Claims, 2 Drawing Sheets

(56) References Cited

FOREIGN PATENT DOCUMENTS

| EP | 3584450 A1 | 12/2019 |
| EP | 3957866 A1 | 2/2022 |
| WO | WO 9201162 A1 | 1/1992 |
| WO | WO 2005024245 A1 | 3/2005 |

OTHER PUBLICATIONS

Agricultural and forestry tractors and implements—Hydraulic power beyond, ISO 17567:2020(E), 10 pages.
U.S. Appl. No. 18/348,606, filed Jul. 7, 2023.
European Search Report issued in Application No. 23182564.7, dated Dec. 18, 2023, 9 pages.
European Search Report issued in Application No. 23182565.4, dated Dec. 20, 2023, 10 pages.

LOAD-CONTROLLED HYDRAULIC SUPPLY FOR AN ATTACHMENT ATTACHED TO AN AGRICULTURAL TRACTOR

CROSS-REFERENCE TO RELATED APPLICATIONS

This application claims priority to German Patent Application No. 102022117880.3, filed Jul. 18, 2022, which is hereby incorporated by reference.

FIELD OF THE DISCLOSURE

The disclosure relates to a load-controlled hydraulic supply for an attachment attached to an agricultural tractor.

BACKGROUND

In recent years an increasing trend toward agricultural attachments with working functions becoming ever more complex has been observed. Typically, hydraulic actuators in the form of a wide variety of actuating and/or drive devices are used for carrying out the working functions.

SUMMARY

As the complexity of the working functions increases, generally so does the number of required hydraulic actuators, and therefore the number of hydraulic ports, to be provided on the agricultural tractor for the hydraulic supply thereof. Since the number of hydraulic ports is naturally limited, what are referred to as power-beyond interfaces are gaining ever more importance. These are standardized in ISO17567 and provide a requirement-dependent supply of hydraulic consumers, which are connected thereto, with hydraulic fluid. For this purpose, the hydraulic supply is designed to be load-controlled as what is referred to as a load-sensing system, wherein the power-beyond interface includes a total of four hydraulic ports:

P—supply port
LS—load-indicating port for pressure feedback
R—return port
D—drainage port The return port, like the drainage port, serves merely for the hydraulic fluid to flow back into a hydraulic reservoir of the agricultural tractor; the two ports will therefore not be discussed further here. The focus is rather on the supply port and on the load-indicating port since these ports are crucial for the actual functioning of the load-controlled hydraulic supply. A volume flow adapted in accordance with the load-indicating pressure prevailing at the return-indicating port is thus provided by the hydraulic high-pressure source, which can be a variable displacement pump fed from the hydraulic reservoir, via the supply port.

Attachments equipped with hydraulic actuators frequently transmit an excessive load-indicating pressure, i.e. which is inappropriate for the actual supply requirements, to the hydraulic supply via the load-indicating line. This causes the hydraulic supply to generate, and to provide via the supply line, a supply pressure exceeding the actual requirements of the hydraulic actuators, consequently leading to correspondingly inefficient operation.

In view thereof, it is the object of the present disclosure to improve a load-controlled hydraulic supply of the type mentioned at the beginning with regard to efficient operation.

This object is achieved by a load-controlled hydraulic supply having the features of one or more of the following embodiments.

The load-controlled hydraulic supply for an attachment attached to an agricultural tractor comprises a supply line fed by a hydraulic high-pressure source, a return line leading into a hydraulic reservoir, and a load-indicating line, wherein the hydraulic supply provides a volume flow, which passes through the supply line, in accordance with pressure feedback prevailing at the load-indicating line. According to the disclosure, the load-indicating line is connected to a device for pressure limiting.

In this way, it is possible to generate, and to provide via the supply line, a supply pressure adapted to the actual requirements of the hydraulic actuators. The extent of the pressure limiting is adapted here to the anticipated hydraulic supply requirements of the hydraulic actuators and is conventionally specific to each attachment model. Associated inefficiencies during operation of the load-controlled hydraulic supply can thus be reliably avoided.

The pressure-compensated control valve can be formed here from a combination of a 2/2-way proportional valve with a pressure-regulating valve, wherein the pressure-regulating valve compares an outlet-side hydraulic pressure with an inlet-side hydraulic pressure at the 2/2-way proportional valve and sets the outlet-side hydraulic pressure to a fixed differential pressure. Thus, the 2/2-way proportional valve keeps the volume flow emerging from its respective open position substantially constant even in the event of load fluctuations of the hydraulic actuators and/or of operationally induced pressure fluctuations within the hydraulic supply. To predetermine the volume flow, the 2/2-way proportional valve can be brought into its open position via the actuation device, which can be activated, for example, electrically or mechanically, counter to a restoring force produced via a spring element.

Advantageous developments of the load-controlled hydraulic supply are disclosed herein.

The device for pressure limiting can include a pressure-limiting valve leading into a hydraulic reservoir or a pressure-reducing valve located in the load-indicating line.

The pressure-limiting valve is connected on the inlet side to the load-indicating line and is connected on the outlet side to the hydraulic reservoir. When a predetermined pressure threshold value is exceeded, the pressure-limiting valve takes up an open position counter to a restoring force generated via a spring element, and therefore pressure is correspondingly relieved by hydraulic fluid flowing off out of the load-indicating line in the direction of the hydraulic reservoir.

If, for reasons of efficiency, a (further) outflow path in the direction of the hydraulic reservoir is undesirable, the use of a pressure-reducing valve instead of the pressure-limiting valve is preferable in some embodiments. The pressure-reducing valve is prestressed into an open position under the action of a restoring force generated via a spring element and, when a predetermined pressure threshold value on the outlet side is exceeded, is forced into a closed position so that further passage of hydraulic fluid is prevented.

The pressure threshold value is predetermined individually depending on the respective attachment model and is typically of the order of magnitude of 100 to 190 bar.

In order to prevent a sudden or uncontrolled drop in pressure in the load-indicating line when the pressure-limiting valve is opened, it is conceivable that the pressure-limiting valve communicates with the load-indicating line via a series-connected flow-limiting element. The flow-limiting element can be connected here upstream or downstream of the pressure-limiting valve in the load-indicating line. The flow-limiting element is typically an orifice or a throttle.

For example, the device for pressure limiting is adjustable with regard to the predetermined pressure threshold value via a further actuation device. In the event that the device for pressure limiting is a pressure-limiting valve or a pressure-reducing valve, the further actuation device is designed for limiting the restoring force of the respective spring element and, for this purpose, can be activated electrically or mechanically.

Furthermore, in the supply line there can be a pressure-compensated control valve with an actuation device for adjusting the volume flow. It is possible here to predetermine the volume flow, which passes through the pressure-compensated control valve, by corresponding activation of the actuation device in such a manner that hydraulic consumers located in the agricultural tractor are prioritized. These may relate for example to safety-relevant hydraulic functions of the agricultural tractor, for example a hydraulic steering or braking system.

On the other hand, operating situations are also possible in which an undersupply of the hydraulic actuators of the attachment occurs, especially whenever an insufficient load-indicating pressure is transmitted to the hydraulic supply of the agricultural tractor. Under such circumstances, it is conceivable for there to be a valve arrangement for variably increasing a load-indicating pressure prevailing externally at the load-indicating line, the valve arrangement raising the load-indicating pressure to a level leading to an appropriate volume flow, typically by up to 40 bar.

For this purpose, the valve arrangement can comprise a 2/2-way valve which is pilot-actuated via the externally prevailing load-indicating pressure, wherein the 2/2-way valve is connected on the inlet side to the hydraulic high-pressure source and is prestressed into its open position via an actuating force of a spring element that assists the pilot actuation. The 2/2-way valve therefore forms a booster valve with which the extent of the increase in pressure arises directly from the respective actuating force of the spring element. In some embodiments, the actuating force can be changed via an electrically or mechanically activatable actuation device, and therefore an individual raising of the load-indicating pressure is possible, which takes into account the specific requirements of a particular attachment model.

The use of a pilot-actuated 2/2-way valve as a booster valve leads not only to a particularly simple construction of the valve arrangement, but at the same time prevents an external admission of contamination via the load-indicating line into the hydraulic supply of the agricultural tractor. This is because the externally prevailing load-indicating pressure serves merely for pilot actuation of the 2/2-way valve, but there is not a direct connection to the hydraulic supply of the agricultural tractor.

In addition, an enable valve designed as a further 2/2-way valve can be connected in series with the 2/2-way valve, wherein the further 2/2-way valve is pilot-actuated via the externally prevailing load-indicating pressure in such a manner that the further 2/2-way valve takes up an open position when a predetermined pressure threshold value is exceeded. The further 2/2-way valve ensures that the increased load-indicating pressure generated via the booster valve is transmitted exclusively internally to the hydraulic supply whenever a corresponding external supply requirement (attachment-side) prevails at the load-indicating line.

The pressure threshold value arises here from the restoring force of a spring element which is dimensioned such that the further 2/2-way valve reliably takes up its closed position in the unactuated state. The pressure threshold value arising to this extent is typically of the order of magnitude of 2 to 4 bar.

As a result, the load-controlled hydraulic supply according to the disclosure, within the scope of its different configurations, permits a comprehensive correction of mismatches between the load-controlled hydraulic supply in an agricultural tractor and an attachment-side hydraulic system, which serves for operating associated hydraulic actuators.

The above and other features will become apparent from the following detailed description and accompanying drawings.

BRIEF DESCRIPTION OF THE DRAWINGS

The load-controlled hydraulic supply according to the disclosure for an attachment attached to an agricultural tractor will be described in more detail below with reference to the drawings. Here, identical reference signs relate to corresponding components or components which are of comparable function. In the drawings.

DETAILED DESCRIPTION

The embodiments or implementations disclosed in the above drawings and the following detailed description are not intended to be exhaustive or to limit the present disclosure to these embodiments or implementations.

Figure 1:
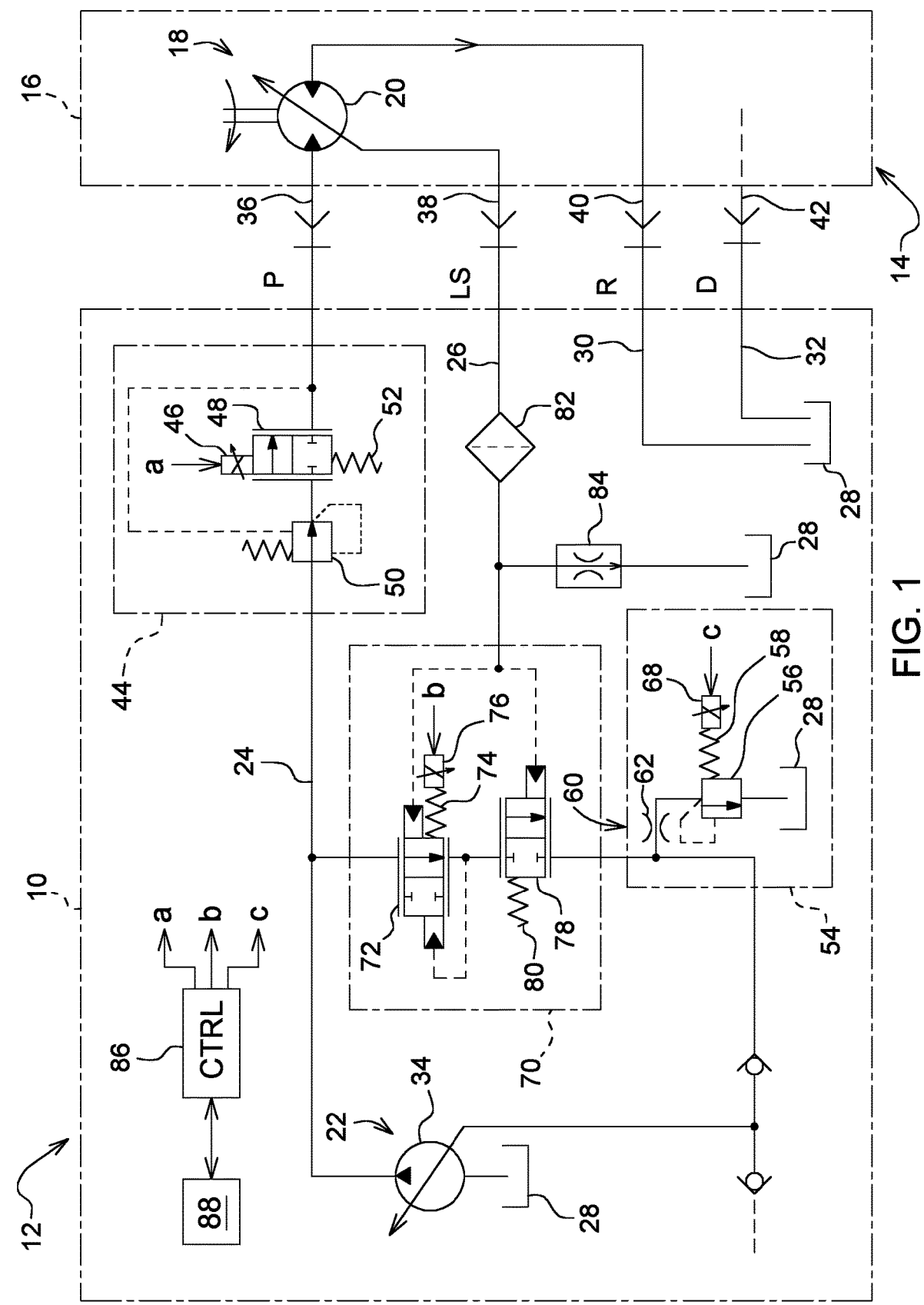
FIG. 1 shows a schematically illustrated first exemplary embodiment of the load-controlled hydraulic supply according to the disclosure.

FIG. 1 shows a first exemplary embodiment of the load-controlled hydraulic supply according to the disclosure.

The hydraulic supply 10 which is schematically illustrated in FIG. 1 serves for operating an attachment 14 attached to an agricultural tractor 12, more specifically for operating at least one hydraulic actuator 18 which is included by an attachment-side hydraulic system 16 and is in the form of an actuating and/or drive device 20, depicted representatively as a hydraulic motor and via which an associated working function of the attachment 14 can be carried out.

The load-controlled hydraulic supply 10 forms what is referred to as a power-beyond interface with a total of four hydraulic ports:

P—supply port
LS—load-indicating port for pressure feedback
R—return port
D—drainage port Each of the hydraulic ports P, LS, R and D merges into an associated hydraulic line, more specifically into a supply line 24, which is fed by a hydraulic high-pressure source 22, a load-indicating line 26 and a return or drainage line 30, 32 leading into a hydraulic reservoir 28.

The return port R, like the drainage port D, serves merely for the hydraulic fluid to flow back into the hydraulic reservoir 28 of the agricultural tractor 12; the two ports will therefore not be discussed further here. The focus is rather on the supply port and on the load-indicating port P, LS since these ports are crucial for the actual functioning of the load-controlled hydraulic supply 10. A volume flow adapted in accordance with the load-indicating pressure prevailing at the return-indicating port LS is thus provided by the hydraulic high-pressure source 22, which is a variable displacement pump 34 fed from the hydraulic reservoir 28, via the supply port P.

In other words, the load-controlled hydraulic supply 10 forms what is referred to as a load-sensing system which provides a volume flow, which passes through the supply line 24 in the direction of the supply port P, in accordance with pressure feedback prevailing at the load-indicating line 26.

The attachment-side hydraulic system 16 provided for operating the at least one hydraulic actuator 18 is connected releasably to the load-controlled hydraulic supply 10 via associated hydraulic hoses or hydraulic couplers 36, 38, 40, 42.

Furthermore, in the supply line 24 there is a pressure-compensated control valve 44 with a first actuation device 46 for adjusting the volume flow.

The pressure-compensated control valve 44 is formed from a combination of a 2/2-way proportional valve 48 with a pressure-regulating valve 50, wherein the pressure-regulating valve 50 compares an outlet-side hydraulic pressure with an inlet-side hydraulic pressure at the 2/2-way proportional valve 48 and sets the outlet-side hydraulic pressure to a fixed differential pressure. Thus, the 2/2-way proportional valve 48 keeps the volume flow emerging from its respective open position substantially constant even in the event of load fluctuations of the at least one hydraulic actuator 18 and/or of operationally induced pressure fluctuations within the hydraulic supply 10. To predetermine the volume flow, the 2/2-way proportional valve 48 can be brought into its open position by electrical activation of the first actuation device 46 counter to a restoring force produced via a spring element 52.

Attachments equipped with hydraulic actuators frequently transmit an excessive load-indicating pressure, i.e. which is inappropriate for the actual supply requirements, to the hydraulic supply 10 via the load-indicating line 26. This leads ultimately to the hydraulic supply 10 being caused to generate, and to provide to the supply port P via the supply line 24, a supply pressure exceeding the actual requirements of the hydraulic actuators. In order to prevent the associated losses in efficiency during operation of the hydraulic supply 10, the load-indicating line 26 is connected to a device for pressure limiting 54. The extent of the pressure limiting is adapted here to the anticipated hydraulic supply requirements of the hydraulic actuators and is conventionally specific to each attachment model.

According to the first exemplary embodiment of the load-controlled hydraulic supply that is reproduced in FIG. 1, the device for pressure limiting 54 comprises a pressure-limiting valve 56 leading into the hydraulic reservoir 28.

The pressure-limiting valve 56 is connected on the inlet side to the load-indicating line 26 and is connected on the outlet side to the hydraulic reservoir 28. When a predetermined pressure threshold value is exceeded, the pressure-limiting valve takes up an open position counter to a restoring force generated via a spring element 58, and therefore pressure is correspondingly relieved by hydraulic fluid flowing off out of the load-indicating line 26 in the direction of the hydraulic reservoir 28.

In order to prevent a sudden or uncontrolled drop in pressure in the load-indicating line 26 when the pressure-limiting valve 56 is opened, it is provided that the pressure-limiting valve 56 communicates with the load-indicating line 26 via a series-connected flow-limiting element 60. For example, the flow-limiting element 60 in the form of an orifice 62 is connected in the load-indicating line 26 upstream of the pressure-limiting valve 56, but may also be connected downstream of the pressure-limiting valve 56.

Figure 2:
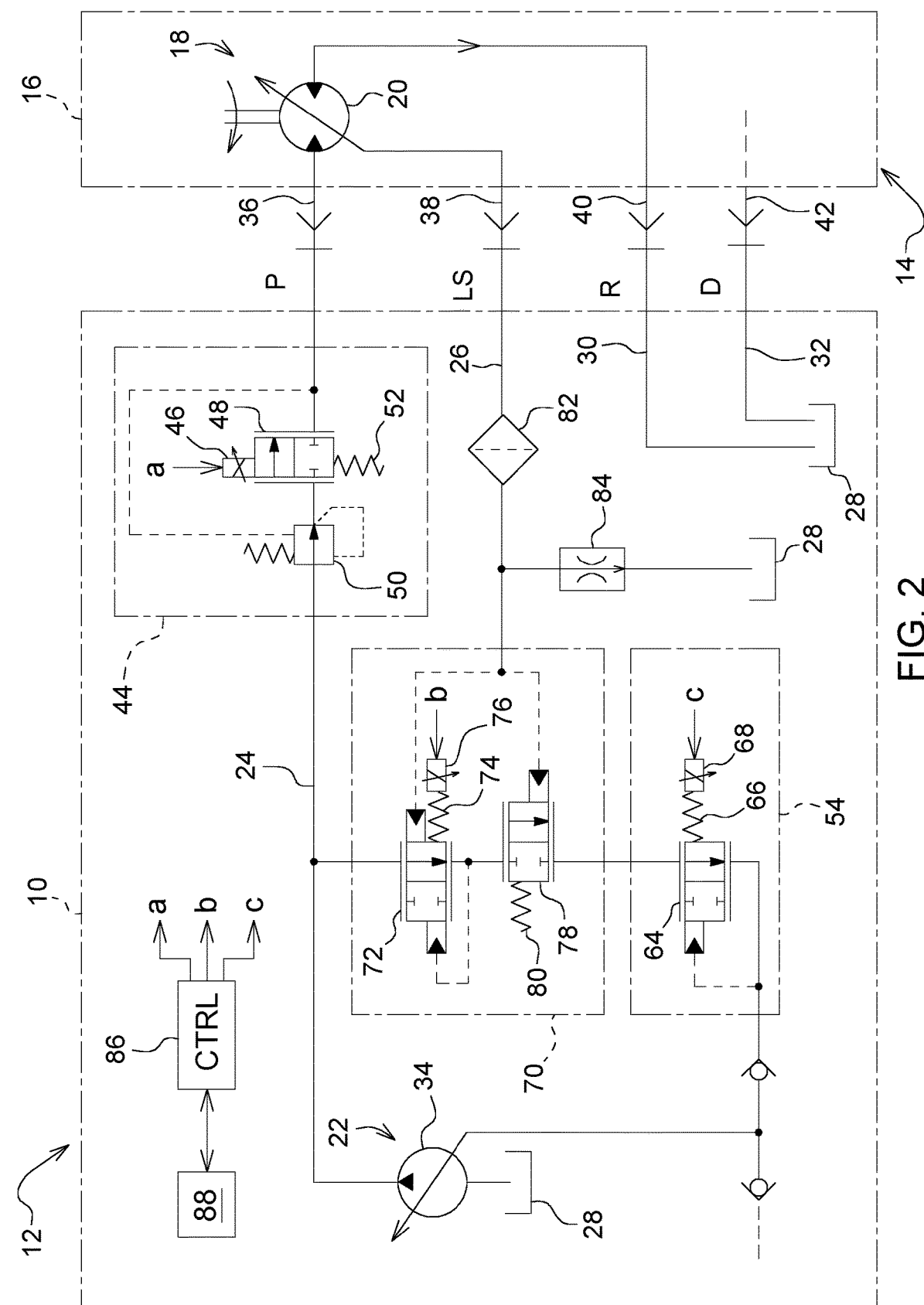
FIG. 2 shows a schematically illustrated second exemplary embodiment of the load-controlled hydraulic supply according to the disclosure.

According to a second exemplary embodiment of the load-controlled hydraulic supply according to the disclosure that is reproduced in FIG. 2, the device for pressure limiting 54 comprises, instead of a pressure-limiting valve 56, a pressure-reducing valve 64 located in the load-indicating line 26.

The two exemplary embodiments correspond with regard to the remaining components.

The pressure-reducing valve 64 is prestressed into an open position under the action of a restoring force generated via a spring element 66 and, when a predetermined pressure threshold value on the outlet side is exceeded, is forced into a closed position so that further passage of hydraulic fluid is prevented.

Both the pressure-limiting valve 56 and the pressure-reducing valve 64 are adjustable with respect to the predetermined pressure threshold value via a respective second actuation device 68. For this purpose, the second actuation device 68 is designed in such a manner that the restoring force of the spring element 58, 66 can be influenced in a targeted way by electrical activation of the second actuation device 68.

The pressure threshold value is predetermined individually depending on the respective attachment model and is typically of the order of magnitude of 100 to 190 bar.

The above-described measures satisfy operating situations in which an oversupply of the at least one actuator 18 with hydraulic fluid occurs because of mismatches between the load-controlled hydraulic supply 10 and the attachment-side hydraulic system 16. On the other hand, operating situations leading to an undersupply are also possible, especially whenever an insufficient load-indicating pressure is transmitted to the hydraulic supply 10 of the agricultural tractor 12. Accordingly, there is a valve arrangement 70 for variably increasing a load-indicating pressure prevailing externally at the load-indicating line 26, i.e. at the load-indicating port LS, the valve arrangement making it possible to raise the load-indicating pressure to a level leading to an appropriate volume flow, typically by up to 40 bar.

For this purpose, the valve arrangement 70 comprises a 2/2-way valve 72 which is pilot-actuated via the externally prevailing load-indicating pressure, wherein the 2/2-way valve 72 is connected on the inlet side to the hydraulic high-pressure source 22 and is prestressed into its open position via an actuating force of a spring element 74 that assists the pilot actuation. The 2/2-way valve 72 therefore forms a booster valve with which the extent of the increase in pressure arises directly from the respective actuating force of the spring element 74. On the outlet side, a pilot actuation of the 2/2-way valve 72 takes place counter to the actuating force of the spring element 74, and therefore stable pressure conditions arise at the valve.

The actuating force can be changed via an electrically activatable third actuation device 76, and therefore an individual raising of the load-indicating pressure is possible, which takes into account the specific requirements of a particular attachment model.

In addition, an enable valve designed as a further 2/2-way valve 78 is connected in series with the 2/2-way valve 72, wherein the further 2/2-way valve 78 is pilot-actuated via the externally prevailing load-indicating pressure in such a manner that the further 2/2-way valve takes up an open position when a predetermined pressure threshold value is exceeded. The further 2/2-way valve 78 ensures that the increased load-indicating pressure generated via the booster valve, i.e. the 2/2-way valve 72, is transmitted exclusively internally to the hydraulic supply 10 whenever a corresponding external supply requirement (attachment-side) prevails at the load-indicating line 26. The pressure threshold value arises here from the restoring force of a further spring element 80 which is dimensioned such that the further 2/2-way valve 78 reliably takes up its closed position in the unactuated state. The pressure threshold value arising to this extent is typically of the order of magnitude of 2 to 4 bar. For example, the further 2/2-way valve 78 is connected upstream of the 2/2-way valve 72, but it may also be connected downstream of the 2/2-way valve 72.

Optionally, an orifice 84 for relieving the load-indicating line 26 of load in the direction of the hydraulic reservoir 28 is arranged on the load-indicating line 26 next to a filtering element 82, which is arranged directly downstream of the load-indicating port LS and prevents an undesired admission of contamination in the direction of the pilot-actuated 2/2-way valves 72, 78.

The electrical activation of the respective actuation devices 46, 68, 76 for a certain attachment model, the activation being required for eliminating possible mismatches between the hydraulic supply 10 and attachment-side hydraulic system 16, takes place via a microprocessor-controlled control unit 86 (e.g., a controller including a processor and memory), with the relevant attachment model being selected via a user interface 88 communicating with the control unit 86.

Proceeding from the illustrations in FIG. 1 and FIG. 2, the second actuation device 68 acts mechanically directly on the respective spring element 58, 66 to influence the restoring force. In a departure therefrom, it may also be provided, however, that a counterforce opposing the restoring force can be generated at the pressure-limiting valve 56 or at the pressure-reducing valve 64 via the second actuation device 68, with there not being a direct intervention in the spring element 58, 66. The same applies to the third actuation device 76 and to the spring element 74 associated therewith to this extent.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A load-controlled hydraulic supply for an attachment attached to an agricultural tractor, comprising:
   a variable displacement pump providing a volume flow in a supply line;
   a return line leading to a hydraulic reservoir; and
   a load-indicating line connected to a pressure-limiting valve;
   wherein the volume flow is adjusted based on pressure feedback prevailing at the load-indicating line; and
   wherein the valve arrangement comprises a first 2/2-way valve which is pilot-actuated via the externally prevailing load-indicating pressure, wherein the first 2/2-way valve is connected on the inlet side to the variable displacement pump and is prestressed into its open position via an actuating force of a spring element that assists the pilot actuation.

2. The hydraulic supply of claim 1, wherein the pressure-limiting valve leads into the hydraulic reservoir.

3. The hydraulic supply of claim 1, wherein the pressure-limiting valve communicates with the load-indicating line via a series-connected flow-limiting element.

4. The hydraulic supply of claim 1, wherein the pressure-limiting valve is adjustable with regard to the predetermined pressure threshold value.

5. The hydraulic supply of claim 1, wherein in the supply line there is a pressure-compensated control valve for adjusting the volume flow.

6. The hydraulic supply of claim 1, further comprising a valve arrangement for variably increasing a load-indicating pressure prevailing externally at the load-indicating line.

7. The hydraulic supply of claim 1, wherein an enable valve designed as a second 2/2-way valve is connected in series with the first 2/2-way valve, wherein the second 2/2-way valve is pilot-actuated via the externally prevailing load-indicating pressure in such a manner that the second 2/2-way valve takes up an open position when a predetermined pressure threshold value is exceeded.

8. A load-controlled hydraulic supply for an attachment attached to an agricultural tractor, comprising:
   a variable displacement pump providing a volume flow in a supply line;
   a pressure-compensated control valve for adjusting the volume flow in the supply line;
   a return line leading to a hydraulic reservoir;

a pressure-reducing valve located in a load-indicating line; and a valve arrangement for variably increasing a load-indicating pressure prevailing externally at the load-indicating line;

wherein the volume flow is adjusted based on pressure feedback prevailing at the load-indicating line; and wherein the valve arrangement comprises a first 2/2-way valve which is pilot-actuated via the externally prevailing load-indicating pressure, wherein the first 2/2-way valve is connected on the inlet side to the variable displacement pump and is prestressed into its open position via an actuating force of a spring element that assists the pilot actuation.

9. The hydraulic supply of claim 8, wherein the pressure-reducing valve is adjustable with regard to the predetermined pressure threshold value.

10. The hydraulic supply of claim 8, wherein an enable valve designed as a second 2/2-way valve is connected in series with the first 2/2-way valve, wherein the second 2/2-way valve is pilot-actuated via the externally prevailing load-indicating pressure in such a manner that the second 2/2-way valve takes up an open position when a predetermined pressure threshold value is exceeded.

11. A load-controlled hydraulic supply for an attachment attached to an agricultural tractor, comprising:
a variable displacement pump providing a volume flow in a supply line;
a return line leading to a hydraulic reservoir; and
a load-indicating line connected to a pressure-reducing valve;
wherein the volume flow is adjusted based on pressure feedback prevailing at the load-indicating line; and
wherein the valve arrangement comprises a first 2/2-way valve which is pilot-actuated via the externally prevailing load-indicating pressure, wherein the first 2/2-way valve is connected on the inlet side to the variable displacement pump and is prestressed into its open position via an actuating force of a spring element that assists the pilot actuation.

12. The hydraulic supply of claim 11, wherein the pressure-reducing valve is adjustable with regard to the predetermined pressure threshold value.

13. The hydraulic supply of claim 11, wherein in the supply line there is a pressure-compensated control valve for adjusting the volume flow.

14. The hydraulic supply of claim 11, further comprising a valve arrangement for variably increasing a load-indicating pressure prevailing externally at the load-indicating line.

15. The hydraulic supply of claim 11, wherein an enable valve designed as a second 2/2-way valve is connected in series with the first 2/2-way valve, wherein the second 2/2-way valve is pilot-actuated via the externally prevailing load-indicating pressure in such a manner that the second 2/2-way valve takes up an open position when a predetermined pressure threshold value is exceeded.

* * * * *